United States Patent [19]

Dischert et al.

[11] 4,191,971
[45] Mar. 4, 1980

[54] SYSTEM FOR CONNECTING A PLURALITY OF VIDEO SENDING TELEVISION APPARATUS

[75] Inventors: Robert A. Dischert, Burlington; Laurence J. Thorpe, Marlton, both of N.J.

[73] Assignee: RCA Corporation, New York, N.Y.

[21] Appl. No.: 909,040

[22] Filed: May 24, 1978

[30] Foreign Application Priority Data

May 30, 1977 [GB] United Kingdom ............... 22806/77

[51] Int. Cl.² .............................................. H04N 5/30
[52] U.S. Cl. .................................... 358/210; 358/181; 358/185
[58] Field of Search ....................... 358/185, 210, 181; 179/15 AC

[56] References Cited

U.S. PATENT DOCUMENTS

| | | | |
|---|---|---|---|
| 2,978,538 | 4/1961 | Breese | 358/210 |
| 3,215,774 | 11/1965 | Ikegami | 358/210 |
| 3,463,962 | 8/1969 | Bazim | 315/24 |
| 3,916,436 | 10/1975 | Marey | 358/1 |

Primary Examiner—Robert L. Griffin
Assistant Examiner—Edward L. Coles
Attorney, Agent, or Firm—Eugene M. Whitacre; Paul J. Rasmussen; Robert L. Troike

[57] ABSTRACT

A transmission line cable terminated at both ends is routed through a plurality of separate television cameras and a television monitor. Each camera includes a current source coupled to the cable. The video from the camera modulates the current source to produce a signal across the terminations without changing the impedance across the line.

6 Claims, 3 Drawing Figures

SYSTEM FOR CONNECTING A PLURALITY OF VIDEO SENDING TELEVISION APPARATUS

BACKGROUND OF THE INVENTION

This invention relates to television apparatus and more particularly to a system for connecting a plurality of video sending apparatus to a receiving apparatus.

Television camera systems typically utilize monitoring systems to provide at a central location the ability for an operator to visually monitor the video image from the camera as well as to display for adjustment purposes selected video waveforms so that the camera adjustment may be made. Since a television studio may use many cameras, the central control location is normally equipped with a remote setup control unit and an operator's control unit.

Typical monitoring signals are, for example, red, blue, and green video waveforms as displayed on an oscilloscope, or red, blue, green video images displayed on a picture monitor. In the prior art system using a plurality of cameras, multiple cables from each of the cameras is coupled to a plurality of video switches and the outputs of these switches are coupled to the monitoring devices. Often the switcher has limited capacity and when it is desired the system be expanded to add another camera system, it is difficult and costly when the switcher has reached its capacity. Also, it is costly for the time and delay in routing the additional cables for adding any new camera system.

SUMMARY OF THE INVENTION

A system is provided which overcomes the limitations discussed above by routing a transmission line cable terminated at both ends continuously through each piece of similar video sending apparatus and the receiving apparatus. The cable is coupled at each video sending apparatus to a current source. The video signal to be sent to the receiving apparatus modulates the current to produce a signal across the terminations without changing the impedance across the line.

DESCRIPTION OF THE INVENTION

Figure 1:
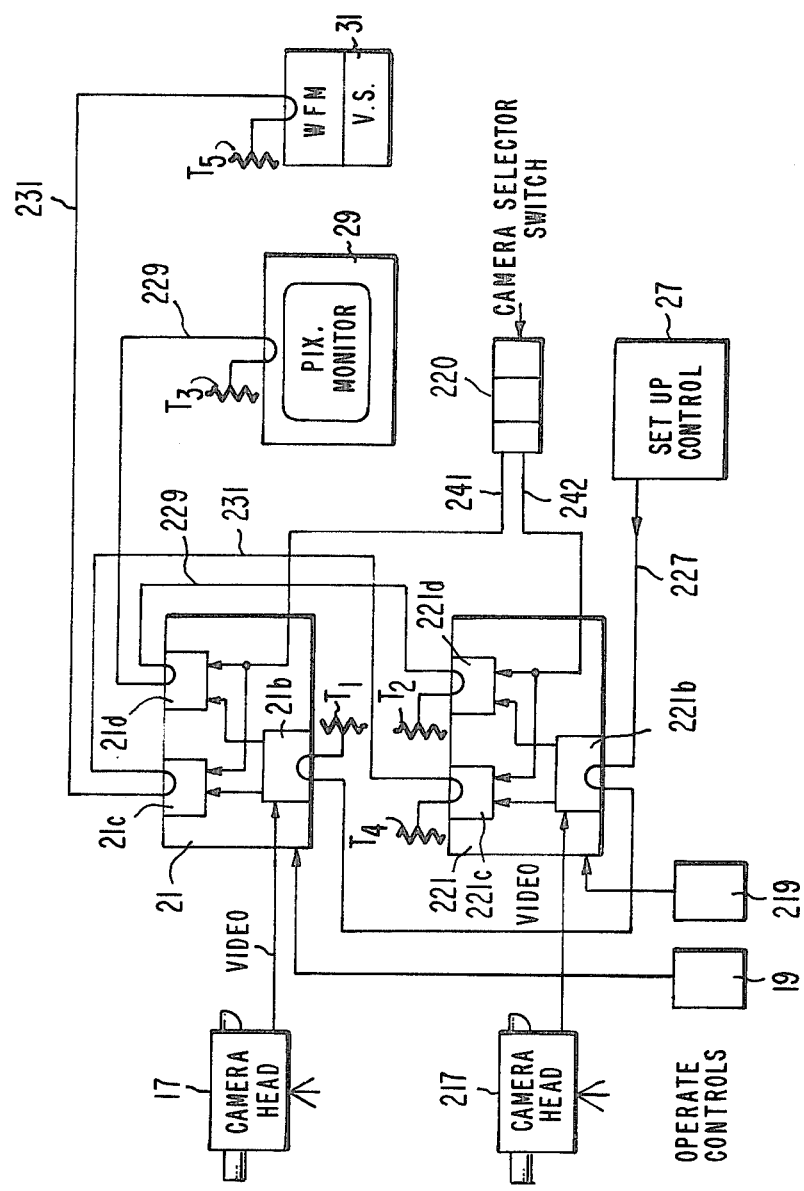
FIG. 1 illustrates a multi-camera system with one setup control and one set of monitors with a camera selector switch according to one embodiment of the present invention.

The present invention describes a monitoring system which can be advantageously used with the television camera system described in the following applications: application Ser. No. 894,011, filed Apr. 6, 1978 of Robert A. Dischert, entitled "Television Control System"; application Ser. No. 894,009, filed Apr. 6, 1978 of Robert A. Dischert and Laurence J. Thorpe, entitled "Control System For A TV Camera"; application Ser. No. 894,010, filed Apr. 6, 1978 of Robert A. Dischert and Laurence J. Thorpe, entitled "Setup Control Unit For Television Cameras" and application Ser. No. 894,008, filed Apr. 9, 1978 of Robert A. Dischert, entitled "Automatic Setup System For Television Cameras". These cases deal with television camera equipment and accessories for providing both the operator's adjustments and the setup adjustments of the camera. The operator's adjustments are made at an operator's console while the camera is performing in an operational mode. These adjustments include iris, black level, gain and balance controls. However, the setup adjustments which are typically made prior to the operational mode are greater in number. There may be for example, approximately 100 setup controls.

In accordance with the system described in the above cited applications, there is provided a camera processor which includes a Random Access Memory (RAM) which stores in a binary digital format at the camera processor the setup and operator's control voltage values which are used to set up the camera head and are used to set up the camera processor. The binary setup control signals are converted to pulse amplitude modulated signals and most of these are coupled via a coaxial transmission line to the camera head. The camera head includes the image pickup tubes and the precision optical mounts, mechanical assemblies and appropriate electronics to scan an image and produce the video signals representing the image. An operator's console which has an associated picture monitor is coupled to a camera processor and provides in a digital format binary signals representative of the potentiometer settings at the operator's console to the RAM in the camera processor. Each television field, the binary signals stored in the RAM of the camera processor are sequenced to the camera head to provide the setup and operator's control values to the camera head. The setup adjustments for the camera are accessed by a setup control unit which provides an 8-bit correction code signal to the RAM on a selected basis to provide correction control signals to the RAM. At the setup control unit location is provided a picture monitor and a waveform monitor. The proper video to these monitors is switched by a switch located in the camera processor. This switch is represented by switch 21b in FIG. 2 of the above cited applications. An expanded block diagram of the switch is illustrated in FIG. 10 of the above cited applications. The selection of the video applied to the picture monitor and the waveform monitors is provided by setup control signals from the setup control unit to the switch 143 in FIG. 10.

Referring to FIG. 1, there is illustrated a multi-camera system with one setup control for each of the cameras and one set of monitors for each of the cameras. As illustrated in FIG. 1, there is the camera head 17 and the camera head 217. The camera head 17 is coupled to the camera processor 21 and the camera head 217 is coupled to the camera processor 221. The operator's control 19 is coupled to the camera processor 21 and the operator's control 219 is coupled to the camera processor 221. A transmission line cable 227 from the setup control unit 27 is looped through the camera processor 221 and through the camera processor 21 and is terminated at termination $T_1$. The cable 227 at the camera processor 21 loops through the camera processor 21 and extends to the output thereof. The cable 227 at the end is terminated in the characteristic impedance of the line 227 by a resistive load termination $T_1$. More cameras may be added to the system by simply disconnecting termination $T_1$ and by connecting at the point of the termination a similar cable which is looped through another camera processor and terminated in similar manner. The transmission line cable 227 is tapped at a high impedance point along the line in the processor. As mentioned in the above cited applications, the signals from the setup control unit are binary digital signals.

A single transmission line cable 229 is terminated at both ends T$_2$ and T$_3$ in the line characteristic impedance. This cable may preferably be a coaxial transmission line for example. In the case of a coaxial line, the outer conductor is coupled to ground or reference potential and the terminations are provided by a resistor connected between the center and the outer conductor at each of the ends. This line cable 229 loops through the camera processor 21, camera processor 221 and the picture monitor 29. The same picture monitor may be used for other camera systems by connecting at terminal T$_2$ a cable which extends through these other cameras and by terminating the line.

Similarly, a single cable 231 is terminated at both ends T$_4$ and T$_5$ in the line characteristic impedance. The cable 231 loops through the camera processor 21, the camera processor 221 and the waveform monitor and vectorscope 31. Other cameras with processors may be added to use the same monitor by disconnecting the load, connecting a cable at terminal point which loops through in a similar manner the other camera processors and reconnecting the load at the remote end.

As mentioned in the above cited applications, during the setup control period binary digital switch signals from the setup control unit are coupled to the central processors for controlling the video to be applied to the monitor. In the system of FIG. 1, the binary digital setup control signals are sent along the looped through cable 227 from the setup control unit 27 to the camera processors 21 and 221. These digital switch control signals are decoded in the video switches 21b and 22b to select the video to be applied to the two looped through cables 229 and 231 to the picture monitor 29 and waveform monitor 31, respectively. These switch signals are tapped at high impedance points on the cable 227 and detected by a digital decoder in the switches 21b and 221b. The decoded signal provides the control signal to switch the proper video to the cables 229 and 231. The video switch 21b is coupled to the current modulators 21c and 21d, and the selected video from switch 221b is coupled to modulators 221c and 221d. The cables 229 and 231 are looped through these modulators. A camera selector switch 220 includes a push button selector and a decoder which provides disable signal to all but the selected camera. An output cable (cables 241 and 242 for the example) is coupled between the selector switch 220 and each of the camera processors 21 and 221 for disabling the cameras. These cables (cables 241 and 242 in the example) are coupled to each of the modulators in the camera processors.

Figure 2:
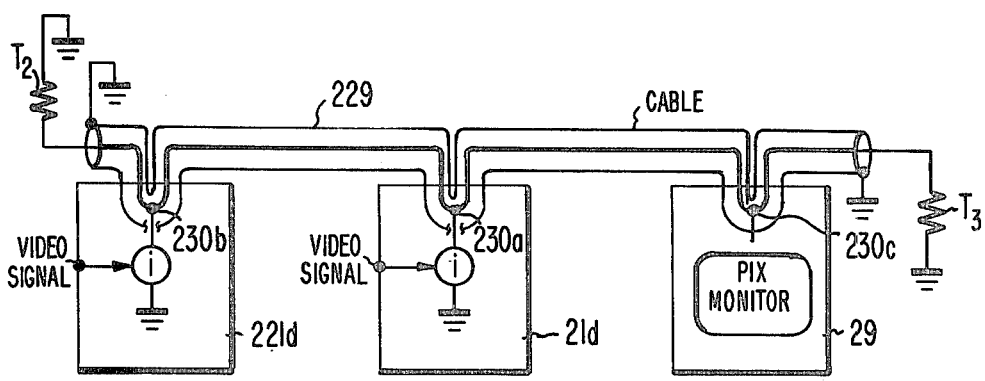
FIG. 2 illustrates the technique extending a single cable to multiple pieces of apparatus.

Referring to FIG. 2, there is illustrated a technique of sending video from the multiple video sending apparatus or in this particular case the multiple camera processors to a common monitor receiver. In order to send the video through the loop cable, it is necessary to supply a signal to the line without adding resistance which would affect the line termination. This is done by driving a line with a current source as illustrated in FIG. 2. As shown in FIG. 2, the cable is looped through the current modulators 21d and 221d and the picture monitor 29. Both ends of the line are terminated in a load and the center conductor of the line is connected to the current driver at points 230a and 230b *and to the monitor at point 230c.* Video signals from each of the camera heads at the video switcher 21b and 221b is selectively coupled to the current modulators 21a, 21d, 221c and 221d.

Figure 3:
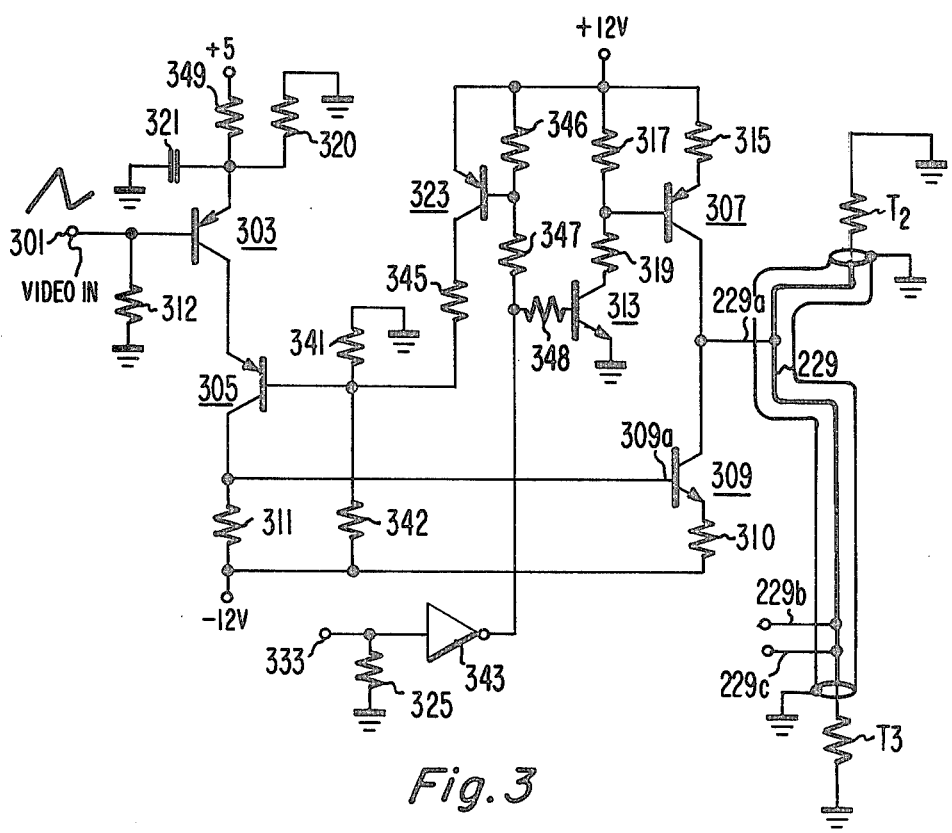
FIG. 3 illustrates a detailed schematic form of a current modulator circuit according to one embodiment of the present invention.

FIG. 3 illustrates in schematic form one embodiment of a current modulator which will not load the line or put D.C. current in the line. Referring to FIG. 3, there is illustrated a current modulator coupled to the cable 229 via lead 229a which cable is terminated at both the sending end and monitor or receiving end by load resistors. At the sending end the termination is resistor T$_2$, and at the monitor end the termination is an equal valued resistor T$_3$. The video from the switches 21b or 221b in FIG. 1 is applied to terminal 301 of FIG. 3. Transistors 303 and 305 are coupled and biased as cascode amplifiers with the collector of PNP transistor 303 coupled to the emitter of common base biased PNP transistor 305. The emitter of transistor 303 includes a resistor 320 and a tunable capacitor 321 adjusted for flattening the amplifier response over the video band. The amplified video signal is applied from the collector of transistor 305 to the base 309a of output NPN transistor 309. Output PNP transistor 307 is biased as a constant current source via the +12 volt supply, resistors 315, 317 and 319 and transistor 313. The NPN transistor 309 bias includes a −12 volt supply, resistors 310 and 311, and transistor 305. The collector of PNP transistor 307 is connected directly to the collector of NPN transistor 309 and these collectors are coupled to cable 229 via line 229a. The transistor 309 acts as a load for transistor 307. The transistors 307 and 309 are biased such that with no video essentially all of the current from the constant current source including transistor 307 is passed through transistor 309 and no D.C. current is on the line 229 and line 229a. The amplified video from the collector of transistor 305 applied to the base 309a of transistor 309 modulates the current such that with negative going signals at the base 309a (reducing drive) a proportional current from the constant current source of transistor 307 is coupled to the line 229. When the video signals to the base 309a are positive going, the current flows in the opposite sense through the line due to the increased drive on transistor 309. This current in the line is applied across the line terminations T$_2$ and T$_3$ providing a voltage signal thereacross without changing the impedance across the line.

The transistors 313 and 323 are disabling switching transistors. The NPN transistor 313 is forward biased and the PNP transistor 323 is reverse biased when not disabling. In the absence of a disabling or high level signal at terminal 333, a low level signal via resistor 325 is provided to inverter 343. This low level signal in the absence of a disabling signal provides a high level signal out of inverter 343 to transistors 313 and 323, biasing transistor 313 "on" and transistor 323 "off". A high level or disable signal at terminal 333 provides a low level signal from inverter 343 switching transistor 313 "off" and 323 "on". This disabling signal is provided from the camera selector switch 220 in FIG. 1. When transistor 313 is biased "off" the base of PNP transistor 307 rises biasing output transistor 307 "off". When transistor 323 is biased "on", PNP transistor 305 is biased "off", removing the video from transistor 309 and causing the base of 309a of the NPN transistor 309 to go more negative and cause transistor 309 to be cut "off". Since both output transistors 307 and 309 are cut off, a high impedance is presented to the cable at line 229a.

In the embodiment illustrated here, all of the current modulators 21c, 221c, 21d and 221d are like that described in connection with FIG. 3. The camera selector switch 220 sends a high level disable signal to all of the current modulators except the one selected to be monitored. The other modulators on line 229 are coupled via leads 229b, 229c, etc. Similarly cable 231 is modulated with current modulators 21c and 221c. These current modulators are each like that described in FIG. 3.

The current modulator of FIG. 3 has been constructed and used and has the following values:

Transistors 303, 305, 307 and 323—2N3906
Transistors 309, 313—2N3904
Resistors 310, 312—75Ω1%
Resistor 315—16Ω1%
Resistors 317, 319—5100Ω
Resistor 311—1000Ω1%
Resistor 349—976Ω1%
Resistor 320—4320Ω1%
Resistor 341—3920Ω1%
Resistor 342—2210Ω1%
Resistor 345—6800Ω
Resistor 346—1600Ω
Resistor 347—2200Ω
Resistor 348—10,000Ω
Capacitor 321—2.5 to 9 pf
Inverter 343—type CD4049 from RCA Corp., Somerville, New Jersey

What is claimed is:

1. A system for connecting a plurality of similar television video sending apparatus to a common receiver apparatus, comprising:
   a plurality of television video sending apparatus each providing a source of video signals,
   video receiver apparatus,
   a single continuous cable transmission line terminated at both ends by a fixed impedance load and routed continuously and serially through each of said video sending apparatus and receiver apparatus,
   each of said video sending apparatus including a current source, said current source coupled to said cable at said apparatus between said terminations, and means for applying said video signals at said apparatus to said current source to modulate the current and thereby provide video signals across said terminations without changing the impedance across the transmission line.

2. The combination of claim 1, wherein said current source is of the type to provide no appreciable D.C. current in the absence of a video signal applied thereto.

3. The combination of claim 1, including disabling means coupled to each of said current source in each of said sending apparatus responsive to a control signal for disabling the modulated current from said source and means for selectively providing control signals to said disabling means for selecting which sending apparatus is coupled to the line.

4. The combination of claim 1, wherein said sending apparatus is a television camera.

5. The combination of claim 4, wherein said receiving apparatus is a television monitor.

6. The combination of claim 1, wherein said transmission line is a coaxial transmission line with a resistor coupled between the inner and outer conductors at the ends thereof to form said terminations.

* * * * *